US005292593A

United States Patent [19]

Talvalkar et al.

[11] Patent Number: 5,292,593

[45] Date of Patent: Mar. 8, 1994

[54] TRANSFER RIBBON FOR USE WITH A THERMAL PRINTER OR WITH AN IMPACT PRINTER

[75] Inventors: Shashi G. Talvalkar, Kettering; Marion E. McCreight, West Carrollton, both of Ohio

[73] Assignee: NCR Corporation, Dayton, Ohio

[21] Appl. No.: 863,940

[22] Filed: Apr. 6, 1992

[51] Int. Cl.[5] .................... B32B 9/00

[52] U.S. Cl. .................... 428/474.4; 428/195; 428/200; 428/337; 428/341; 428/349; 428/690; 428/692; 428/900; 428/913; 428/914

[58] Field of Search .................... 428/195, 487, 488.1, 428/488.4, 207, 329, 342, 480, 913, 914, 483, 527, 537.5, 206, 500, 520, 522, 220, 337, 200, 341, 347, 474.4, 690, 692, 900, 913, 914

[56] References Cited

U.S. PATENT DOCUMENTS

| | | | |
|---|---|---|---|
| 2,744,031 | 5/1956 | Mumma | 428/323 |
| 3,087,832 | 4/1963 | Fogle | 428/447 |
| 3,515,590 | 6/1970 | Lazzarini et al. | 429/481 |
| 3,639,166 | 2/1972 | Fellows et al. | 420/327 |
| 3,677,817 | 7/1972 | Muri et al. | 428/323 |
| 3,978,274 | 8/1976 | Blum | 428/476 |
| 4,132,835 | 1/1979 | Du | 428/522 |
| 4,133,774 | 1/1979 | Brynko et al. | 252/62.1 |
| 4,211,826 | 7/1980 | Du | 428/497 |
| 4,303,696 | 12/1981 | Brack | 427/44 |
| 4,581,283 | 4/1986 | Tokunaga et al. | 428/216 |
| 4,783,360 | 11/1988 | Katayama et al. | 428/212 |
| 4,923,749 | 5/1990 | Talvalkar | 428/195 |
| 4,935,299 | 6/1990 | Yamaguchi et al. | 428/323 |
| 4,983,664 | 1/1991 | Truskolaski et al. | 524/514 |
| 4,988,563 | 1/1991 | Wehr | 428/341 |

*Primary Examiner*—Patrick J. Ryan
*Assistant Examiner*—William A. Krynski
*Attorney, Agent, or Firm*—Craig E. Miller; George J. Muckenthaler

[57] ABSTRACT

A transfer ribbon is suitable for use with either a thermal printer or an impact printer. The transfer ribbon comprises a substrate and a transfer coating which is coated on one side of the substrate. The transfer coating contains about 20 to 60 percent magnetic pigment; about 5 to 10 percent carbon pigment; about 0.1 to 10 percent film forming material; and about 20 to 60 percent wax binder.

18 Claims, 1 Drawing Sheet

TRANSFER RIBBON FOR USE WITH A THERMAL PRINTER OR WITH AN IMPACT PRINTER

BACKGROUND OF THE INVENTION

1. Field of the Invention

This invention relates to a transfer ribbon, and more particularly, it relates to a transfer ribbon which is suitable for use in either a thermal printer or an impact printer and which provides for improved sharpness of any data printed with the transfer ribbon.

2. Description of Related Art

The typical and well-known arrangement in a printing operation provides for transfer of a portion of the ink from an ink ribbon to paper or like record media and which results in a mark or image on the paper. Also known are printing inks which contain magnetic particles wherein certain of the particles are transferred to the record media for encoding characters in a manner and fashion so as to be machine readable in a subsequent operation. MICR (Magnetic Ink Character Recognition) data is magnetic data which is printed utilizing the encoding system just mentioned.

In the printing field, the impact printer and the thermal printer have been the predominant means for printing data on a document or record media. The typical arrangement in the impact printing operation provides for the transfer of a portion of the ink ribbon onto the record media when the ink ribbon is impacted thereagainst. In thermal printers, the intense heating of localized areas of the ink ribbon causes transfer of the ink from the ink ribbon onto the record media. A deficiency with transfer ribbons of the prior art is that they were not readily adaptable for use on both the thermal printer and the impact printer. Another deficiency with thermal ribbons of the past is that they did not provide good print density, sharpness and resistance to smearing if used in an impact printer.

There is, therefore, a need to provide a transfer ribbon which is capable of transferring a sharp mark or image when used in either a thermal printer or in an impact printer.

SUMMARY OF THE INVENTION

The present invention relates to a transfer ribbon. More particularly, the present invention is directed to a transfer ribbon which is capable of transferring a sharp image when the ribbon is used with either a thermal printer or with an impact printer.

In one aspect, this invention comprises a transfer ribbon suitable for use with either a thermal printer or with an impact printer, the transfer ribbon comprising a substrate, and a transfer coating which is coated on one side of the substrate, the transfer coating comprising about 20 to 80 percent pigment, and about 20 to 60 percent primary amide.

In view of the above discussion, a principal object of the present invention is to provide a transfer ribbon that may be used in either a thermal printer or in an impact printer.

Another object of the present invention is to provide a transfer ribbon having improved print density when used in an impact printer.

A further object of the present invention is to provide a transfer ribbon having improved smear resistance when used in an impact printer.

An additional object of the present invention is to provide a transfer ribbon having a substrate and a coating containing only two components for enabling printing with a thermal printer or with an impact printer.

With these and other objects, which will become apparent from the following description, the invention includes certain novel features of construction and combinations of parts, a preferred form or embodiment of which is hereinafter described with reference to the drawing which accompanies and forms a part of this specification.

DETAILED DESCRIPTION OF THE INVENTION

Figure 1:
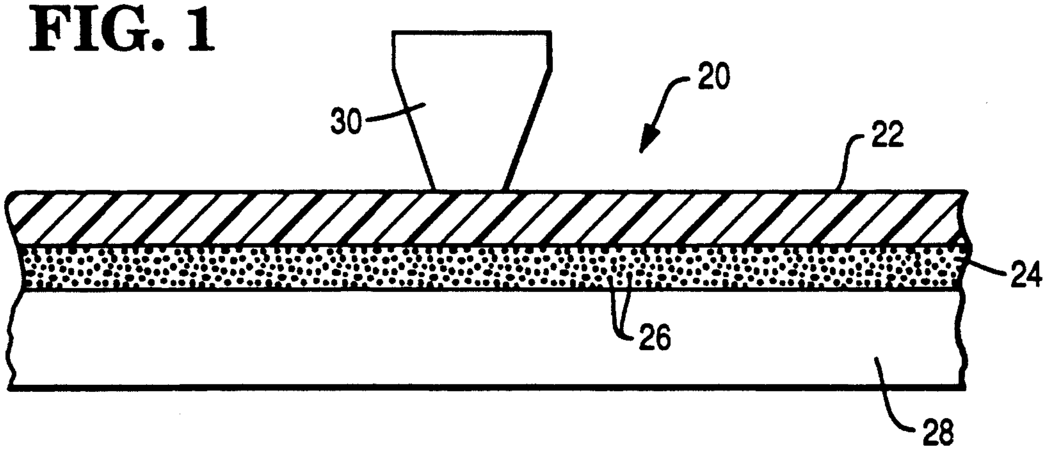
FIG. 1 illustrates a receiving document and a thermal printing element operating with a ribbon base having a magnetic thermal functional coating thereon which incorporates the ingredients as disclosed in the present invention.
Figure 2:
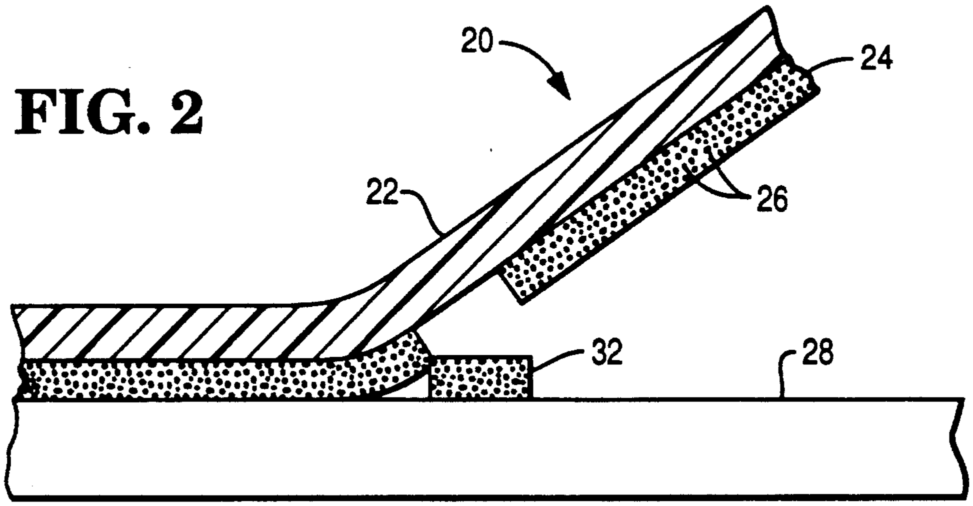
FIG. 2 shows the receiving document with a part of the coating transferred in the form of a digit, symbol or other mark onto the receiving document.

The transfer ribbon 20, as illustrated in FIGS. 1 and 2, comprises a base or substrate 22 of thin, smooth, tissue-type paper or polyester-type plastic and a coating or layer 24 on the substrate. The substrate 22 of the polyester-type plastic is in the range of 14 to 75 gauge polyester, polyethylene, polypropylene or like material. The coating 24 is thermally activated and includes magnetic pigment or particles 26 as an ingredient therein for use in imaging or encoding operations to enable machine reading of characters or other marks. Each character or mark that is imaged on a receiving paper document 28 or like record media produces a unique magnetic pattern or image that is recognized and read by the reader. In the case of ribbons relying on the magnetic thermal printing concept, the pigment or particles 26 include magnetic oxides or like sensible materials.

As alluded to above, it is noted that the use of a thermal printer having a print head element, as 30, substantially reduces noise levels in the printing operation and provides reliability in MICR imaging or encoding of paper or like documents 28. The magnetic thermal transfer ribbon 20 provides the advantages of thermal printing while encoding or imaging the document 28 with a magnetic signal inducible ink. When the heating elements 30 of a thermal print head are actuated, the imaging or encoding operation requires that the pigment or particles of material 26 in the coating 24 on the coated ribbon 20 be transferred from the ribbon to the document 28 in the form of characters 32 for recognition by the reader.

A portion of the transfer coating 24 transfers from the substrate 22 to the receiver stock 28 (FIG. 2) when the transfer coating 24 is thermally activated by means of a thermal printing element, as 30.

Figure 3:
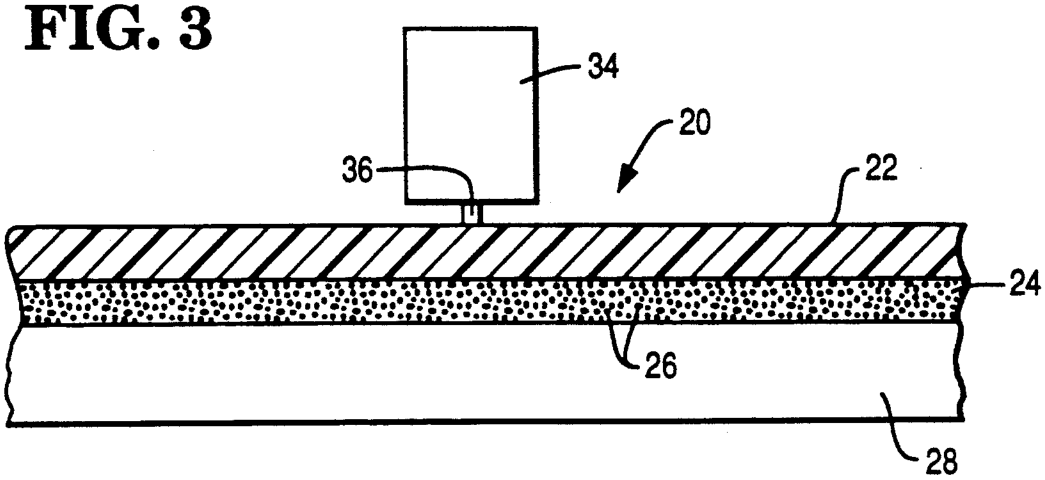
FIG. 3 illustrates a receiving document and an impact printing element operating with the transfer ribbon of the present invention.

FIG. 3 shows an arrangement wherein the transfer ribbon 20 of the present invention is used with an impact printing element. A portion of the transfer coating 24 transfers from the substrate 22 to the receiver stock 28 when the transfer ribbon 20 is impacted, for example, by a print head 34 having one or more print wires, as 36, or a typewriter print element, or an impact encoder.

The functional coating or layer 24 exhibits the following characteristics, namely, the coating must be resistant to rubbing and smudging, the coating must not inhibit transfer of the thermal-sensitive material 26 in the coating 24 at normal print head voltage, pulse width and temperature, and the coating 24 must allow a bond of the magnetic thermal-sensitive material 26 in the coating 24 onto the paper 28 upon transfer of such materials.

The transfer coating 24 may include either magnetic or nonmagnetic pigment or particles as an ingredient therein so that Magnetic Ink Character Recognition ("MICR") data may be printed on the receiver stock 28.

The following examples show coating systems including means for providing a thermally reactive material having a cohesive strength that inhibits smearing of data.

In the simplest form of the thermal or impact transfer coating of the present invention, only two solid ingredients are required. A color pigment such as iron oxide for magnetic signal recognition and a primary amide such as Armid O or Armid C are used. If the recognition of the printed mark, such as optical character recognition (OCR) or a barcode, needs to be accomplished by non magnetic means such as lasers or infra-red or fluorescent sensors, the magnetic iron oxide can be substituted by any other colored or fluorescent pigment with proper reflectance characteristics. The main intent of this invention is not associated with the specificity of the pigments or formulations but to declare that the combination of a properly dispersed pigment and a primary amide is capable of being transferred by thermal or impact energy from a 20 to 75 gauge substrate of either paper or plastic film such as polyester, polyethylene, polypropylene or any other conventional material which is flexible in the 20 to 75 gauge thickness range and wherein the coating weight of the combination is controlled in the range of 5 to 30 milligrams per four square inches.

EXAMPLE I

| Material | % Dry | Wet Wt. | Range (%) |
|---|---|---|---|
| Pigment: | | | |
| Iron Oxide or Colored Pigment | 50.0 | 50.0 | 30–70 |
| Primary Amide: | | | |
| Armid O or Armid C | 50.0 | 50.0 | 30–70 |
| Solvent: | | | |
| N-Propanol (70%) | — | 210.0 | |
| Distilled Water | — | 90.0 | |
| Total | 100.0 | 400.0 | |

Solids Percent: 25.0

In the above example, N-Propanaol can be substituted by Isopropanol or Ethyl Alcohol and Deionized water can be used in place of distilled water.

The most practical way of preparation of this coating is done in two steps. The first step consists of dissolving the primary amide in the solvent and then dispersing the pigment in this mixture of primary amide-solvent in conventional dispersing equipment such as a ball mill or a sand mill or an attritor.

For proper rheological control of viscosity and flow of the dispersed coating, it is noted that small percentage additions of adhesive and grinding aids are necessary. Also for improving the aesthetics of the transferred image or mark, a small amount of dye was also added. It is emphasized that these additives were used only to control the physical appearance and processing characteristics of the coating and the amounts were controlled so that no appreciable difference was observed in the transfer characteristics of the coating either by the thermal transfer or by the impact transfer process.

Example II is a transfer coating 24, arranged as shown in FIG. 1, and which was applied to the substrate 22.

EXAMPLE II

| Material | % Dry | Wet Wt. | Range (%) |
|---|---|---|---|
| Magnetic Iron Oxide Pigment: | | | |
| BASF 0045 | 40.0 | 106.4 | 30–70 |
| Magnox | 20.0 | 53.2 | |
| Primary Amide: | | | |
| Armid O | 36.0 | 95.8 | 30–70 |
| Dye: | | | |
| Basonyl Black X-22 | 1.0 | 5.3 | 0–10 |
| Adhesive: | | | |
| EHEC X-Low | 2.0 | 5.3 | 0–10 |
| Grinding Aid: | | | |
| PVP | 1.0 | 2.7 | 0–10 |
| Solvent: | | | |
| Isopropanol | — | 388.2 | |
| Lacolene | — | 43.1 | |
| Total | 100.0 | 700.0 | |

In this example a mixture of iron oxides were used. The MAGNET BLACK BASF 0045, iron oxide pigment has a spherical particle shape and the particle size is controlled in the submicron range. This iron oxide exhibits better transfer characteristics both by thermal and impact transfer but lacks in the hiding power because of its fine particle size. To compensate for this deficiency, a smaller amount of iron oxide with a coarser and acicular particle size such as Magnox was used. A two to one ratio of these iron oxides provides a coating with good hiding power and optimum transfer characteristics.

The Magnet Black iron oxide is manufactured by BASF Corporation and the Magnox iron oxide is available from Magnox Inc. of Pulaski, Va. The Basonyl Black X-22 liquid is available as a 50 percent solution of Nigrosine Dye in N-Propanol from BASF Corporation and is used to darken the transferred image which is normally gray because of the color of iron oxide. There are several manufacturers of the fatty amides used in the present invention. The primary amides are available either from Akzo Chemie America or from Humko Chemical, a Division of Witco Company.

Armid C is a cocoamide and Armid 0 is an oleamide made by Akzo whereas Kemamide E is an erucamide and Kemanide C is an oleamide made by Humko.

The fatty primary amides are used as slip agents or friction reducers or lubricants for coatings and films. The amides are insoluble in water but are slightly soluble at room temperature in other solvents such as N-propanol or Isopropanol. The amides are derived from straight-chain fatty acids and are high-molecular-weight (214 to 279) wax-like materials with melting points ranging from 68° C. to 109° C. A straight-chain molecule of oleamide is $CH_3(CH_2)_7CH{=}CH(CH_2)_7CONH_2$. The primary amides are derivatives of organic carboxylic acids in which the hydroxyl portion of the carboxyl group has been replaced with an amino group, thus the amides are essentially neutral and non-reactive. The structural formula of a fatty acid is as follows:

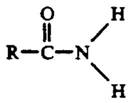

The EHEC X-Low is an ethylhydroxyethylcellulose and is used to hold the materials together and also to bind the materials to the plastic substrate. EHEC is manufactured by Hercules Inc. of Wilmington, Del. Polyvinylpyrrolidone (PVP) is a polymeric material soluble in both alcohol and water and mixtures of alcohol and aliphatic solvents such as Lacolene and is used as a grinding aid to wet the iron oxide pigment particles to improve the sharpness of the transferred image. In this example, a mixture of Isopropanol and Lacolene was used as a solvent mixture to maintain higher coating speeds on a conventional coater.

Efforts were made to evaluate the effect of coating weight on the magnetic signal level, and also to evaluate the effect of the use of a more pliable plastic substrate, such as polypropylene. It was noted that coatings on the more pliable plastic substrates perform better in encoding equipment where a parallel encoding (printing the entire line as compared to serial encoding where one character or digit is encoded at a time) concept is used. Test samples were created at various coating weights with a typical coating as described in Example II using a 50 gauge polypropylene substrate and test documents were created using an NCR 7770 encoder and 24 pound safety paper as a receiver stock. The encoded documents were then analyzed for average signal strength using an RDM MICR Analyzer, manufactured by the Development and Manufacturing Corporation of Waterloo, Ontario, Canada. The following table shows the effect of coating weight on signal strength.

| Coat Weight mg./4 sq. in. | Average Magnetic Signal % Nominal |
|---|---|
| 9.3 | 70 |
| 12.5 | 89 |
| 14.1 | 116 |
| 16.5 | 153 |
| 20.1 | 181 |
| 25.0 | 211 |

A testing operation was set up to test the smear resistance, print density and overall quality of the data printed using the transfer ribbon 10 of the present invention.

SMEAR RESISTANCE

Two tests were conducted to test the improved resistance to smearing of the transferred print data. In the first test, the transfer ribbon 20 was prepared by applying the transfer coating 24 to the substrate 22 by means of conventional coating equipment using the ingredients and quantities described in example II above. The transfer coating 24 was coated on the substrate 22 at 15 to 17 mg/4 sq. in. of coating weight. The test sample of the transfer ribbon 20 was then used to print test data on a 100 pound tab receiver stock (not shown) using an NCR 7770 encoding system.

A control sample was also prepared using a typical conventional impact transfer ribbon that is commercially available. A Sutherland Rub Tester was then used to test the smear resistance of the test sample and of the control sample. Each sample was secured to the oscillating arm of the Rub Tester. The oscillating arm weight was 4 pounds, and it secured the back side of the printed sample.

A sheet of conventional white label stock was secured to the platform of the rub tester. The Rub Tester then caused the oscillating arm to oscillate the printed side of the sample and to rub against the receiving stock for a quantity of 100 times. A quantitative measure of the resistance to smearing of the control sample and the test sample was made by measuring the darkest area on the receiver sheet using a McBeth densitometer. As indicated by Table 1 below, the lower value of the test sample confirmed that it was more resistant to smearing than the control sample.

TABLE 1

| SMEAR RESISTANCE | REFLECTIVITY | |
|---|---|---|
| | BEFORE SMEAR | AFTER SMEAR |
| EXAMPLE II | 0.07 | 0.09 |
| CONTROL SAMPLE | 0.07 | 0.57 |

It is thus seen that herein shown and described is a transfer ribbon for use in the printing field which is suitable for either a thermal printer or an impact printer. The ribbon comprises a substrate and a coating that contains a pigment and a primary amide.

Various changes or modifications in the invention described may occur to those skilled in the art without departing from the spirit or scope of the invention. The above description of the invention is intended to be illustrative and not limiting, and it is not intended that the invention be restricted thereto but that it be limited only by the true spirit and scope of the appended claims.

What is claimed is:

1. A transfer ribbon suitable for use with either a thermal printer or an impact printer, said transfer ribbon comprising:

a substrate in the range of 20 to 75 gauge thickness; and a transfer coating which is coated on one side of said substrate, said transfer coating in the range of 5 to 30 milligrams per four square inches and comprising a mixture containing as essential ingredients about 20–80 percent pigment; and about 20–60 percent primary amide.

2. The transfer ribbon as recited in claim 1 wherein said pigment is selected from the group consisting of magnetic oxide and carbon black which can be recognized by reflective, magnetic or infra-red readers.

3. The transfer ribbon as recited in claim 1 wherein said primary amide is selected from the group consisting of primary amides of the cocoamide and oleamide group.

4. The transfer ribbon as recited in claim 3 wherein said primary is cocoamide.

5. The transfer ribbon as recited in claim 2 wherein said pigment is magnetic iron oxide.

6. The transfer ribbon as recited in claim 2 wherein said pigment is carbon black.

7. The transfer ribbon as recited in claim 2 wherein said pigment is a fluorescent pigment.

8. The transfer ribbon as recited in claim 1 wherein said transfer coating is 60 percent pigment and 40 percent primary amide.

9. The transfer ribbon as recited in claim 3 wherein said pigment is magnetic oxide and said primary amide is oleamide.

10. A transfer ribbon suitable for use with either a thermal printer or an impact printer, said transfer ribbon comprising:

a substrate in the range of 20 to 75 gauge thickness; and a transfer coating which is coated on one side of said substrate, said transfer coating in the range of 5 to 30 milligrams per four square inches and comprising a mixture containing as essential ingredients about 20–60 percent magnetic pigment; about 5–10 percent carbon pigment; about 0.1–10 percent binding material; and about 20–60 percent primary amide.

11. The transfer ribbon as recited in claim 10 wherein said primary amide is selected from the group consisting of primary amides or a combination of primary amides.

12. The transfer ribbon as recited in claim 11 wherein said primary amide is cocoamide.

13. The transfer ribbon as recited in claim 10 wherein said transfer coating is 40 percent magnetic pigment, 20 percent carbon pigment, 35 percent primary amide, and 5 percent binding material.

14. The transfer ribbon as recited in claim 10 wherein said pigment is magnetic oxide, said primary amide is of the cocoamide and oleamide group and said binding material includes an ethylhydroxylethylcellulose.

15. The transfer ribbon as recited in claim 10 wherein said magnetic pigment includes an amount of a pigment of a spherical particle shape and a smaller amount of a pigment of coarser and acicular particle shape.

16. The transfer ribbon as recited in claim 10 wherein said carbon pigment is basonyl black.

17. The transfer ribbon as recited in claim 10 wherein said binding material includes an ethylhydroxylethylcellulose and a polymeric material soluble in aliphatic solvents.

18. The transfer ribbon as recited in claim 15 wherein the ratio of the spherical particle shaped magnetic pigment to the acicular particle shaped magnetic pigment is about 2 to 1.

* * * * *

UNITED STATES PATENT AND TRADEMARK OFFICE

CERTIFICATE OF CORRECTION

PATENT NO. : 5,292,593

DATED : March 8, 1994

INVENTOR(S) : Shashi G. Talvalkar et al.

It is certified that error appears in the above-indentified patent and that said Letters Patent is hereby corrected as shown below:

Column 6, line 62, after "primary" insert --amide--.

Signed and Sealed this

Third Day of October, 1995

Attest:

Bruce Lehman

BRUCE LEHMAN

*Attesting Officer*

*Commissioner of Patents and Trademarks*